United States Patent
Shimizu et al.

(10) Patent No.: US 6,311,013 B1
(45) Date of Patent: *Oct. 30, 2001

(54) SIGNAL REPRODUCING APPARATUS AND SIGNAL REPRODUCING METHOD

(75) Inventors: Yoshinori Shimizu; Makoto Kawamura, both of Tokyo (JP)

(73) Assignee: Sony Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/060,988

(22) Filed: Apr. 15, 1998

(30) Foreign Application Priority Data

Apr. 30, 1997 (JP) .................................................. 9-113136

(51) Int. Cl.$^7$ ...................................................... H04N 5/91
(52) U.S. Cl. .......................... 386/111; 386/112; 386/125; 386/126
(58) Field of Search .................................. 386/46, 92, 95, 386/111, 112, 125, 126, 68, 98; 348/564, 565, 906; H04N 5/91

(56) References Cited

U.S. PATENT DOCUMENTS

| 5,926,230 | 7/1999 | Niijima et al. | 348/564 |
| 5,956,457 | 9/1999 | Hirayama et al. | 386/125 |
| 5,970,205 | 10/1999 | Nakamura et al. | 386/68 |
| 6,009,231 | 12/1999 | Aoki et al. | 386/68 |

FOREIGN PATENT DOCUMENTS

| 0 655 869 | 5/1995 | (EP) . |
| 0 738 078 | 10/1996 | (EP) . |

*Primary Examiner*—Huy Nguyen
(74) *Attorney, Agent, or Firm*—Frommer Lawrence & Haug LLP; William S. Frommer; Glenn F. Savit

(57) ABSTRACT

DVD reproducing apparatus which enables seamless images at a plurality of angles recorded on a DVD to simultaneously be watched or instantaneously be watched even if the images are switched. The frame memory of a DVD reproducing apparatus has m display data storage regions (m is an integer) corresponding to m different images to be displayed, as well as a first decoded data storage region and a second decoded data storage region in which decoded I pictures and P pictures, that is, the decoded image data, are stored.

8 Claims, 15 Drawing Sheets

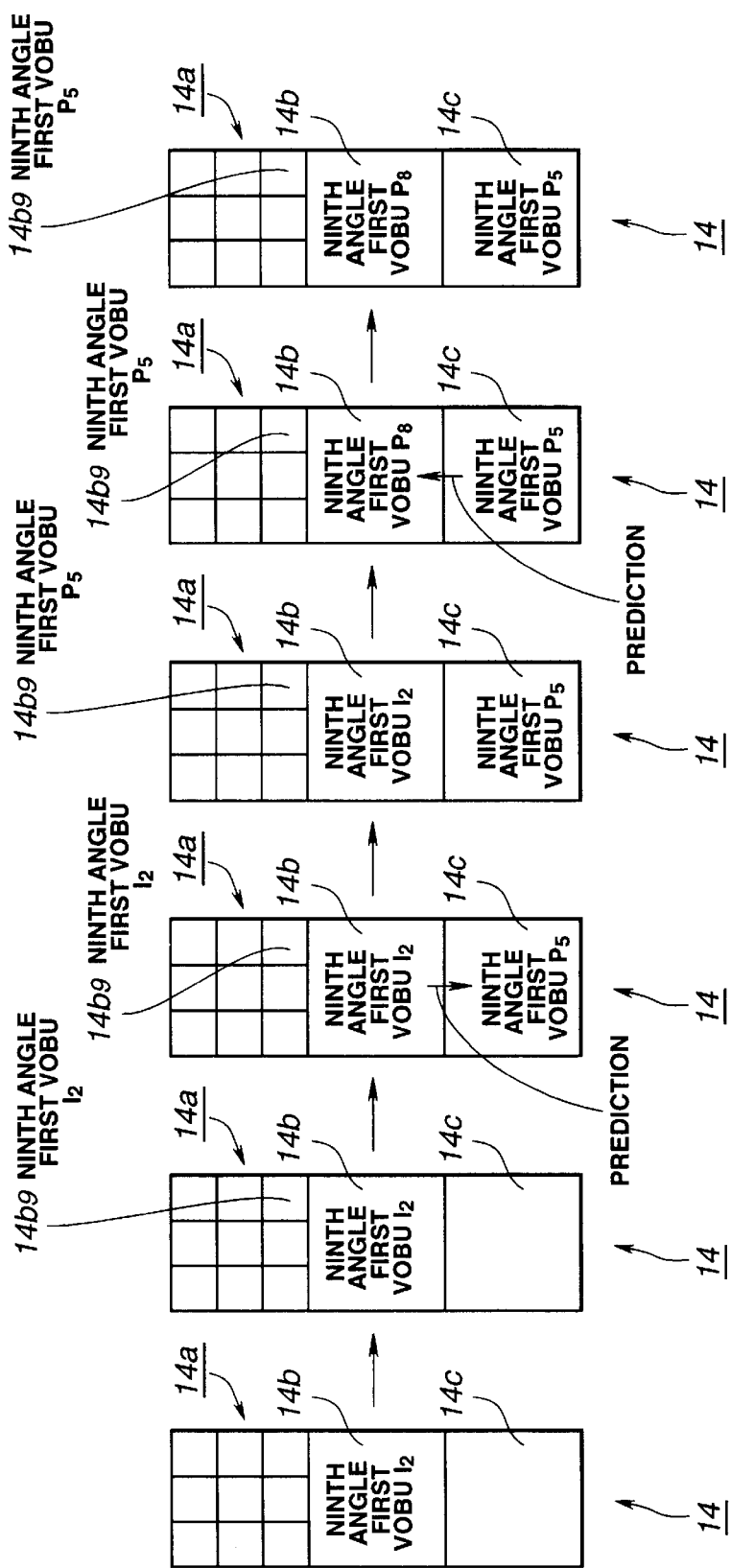

SIGNAL REPRODUCING APPARATUS AND SIGNAL REPRODUCING METHOD

BACKGROUND OF THE INVENTION

1. Field of the Invention

The present invention relates to a signal reproducing apparatus and a signal reproducing method for reproducing a dynamic image by decoding coded image data which forms the dynamic image, and more particularly to a signal reproducing apparatus and a signal reproducing method for reproducing a plurality of dynamic images which have the same attributes.

2. Related Background Art

Optical disks have a common characteristic that random access is permitted. A DVD (Digital Video Disk: DVD-VIDEO) which is one of the optical disks uses the above-mentioned characteristic so that a multi-angle function and a multi-history function are realized.

The multi-angle function is a function for reproducing an image obtained by photographing the image at a plurality of shooting angles. For example, images of one subject at a plurality of angles can be reproduced.

The DVD uses angle blocks each of which is formed by data for enabling images at a plurality of angles to selectively be reproduced. The angle block is formed by sectioning image data photographed at each angle. The DVD employs a so-called "Interleave Structure" in such a manner that the angle blocks are mixed and then recorded on a signal recording surface. Since the DVD employs the foregoing recording structure, the multi-angle function and the multi-story function are realized.

A DVD reproducing apparatus is able to reproduce, for example, a DVD of the foregoing type in such a manner that switching to an image at a required angle is permitted during the reproducing process.

The angle block fall into two categories which is an angle block (hereinafter called "SML_AG_BLK") which can continuously, that is, seamlessly, connected to another angle when images which proceed simultaneously and other angle blocks (hereinafter called "NSML_AG_BLK") with which the angle can be switched only seamlessly.

When a process for reproducing SML_AG_BLK is performed, the DVD reproducing apparatus is able to seamlessly switch the angle. However, several seconds are required to switch the angle. That is, the DVD reproducing apparatus cannot reproduce another angle at the instant that the angle is switched. If a user switches the image which is being reproduced to that at another required angle, the user cannot watch the image at the required angle corresponding to the moment in time at which the angle is switched. As a result, the user cannot watch the required image. When SML_AG_BLK is reproduced, switching of the angle is limited to once in several seconds. Only sub-image data composed of audio data, subtitle information and the like corresponding to the image at the angle which is reproduced is encoded.

When NSML_AG_BLK is reproduced, the DVD reproducing apparatus must temporarily interrupt the reproducing operation when the angle is attempted to be switched. Then, the angle must be switched to another angle after which the reproducing process is restarted. In the case where angles are not smoothly connected to one another, the user cannot enjoy legible images.

When NSML_AG_BLK is reproduced, another angle corresponding to the moment in time at which the angle is switched can be reproduced. Moreover, switching is generally permitted in larger number of portions as compared with SML_AG_BLK. Even if an image is switched to an image at another angle, audio data and sub-image data individual from the image at the other angle can be decoded.

When NSML_AG_BLK and NSML_AG_BLK are reproduced, the DVD reproducing apparatus cannot immediately switch the angle in the seamless manner although it is able to simply switch the angle.

If images at various angles can simultaneously be provided for a user, the user is able to always confirm the images of the various angles. Thus, missing of a required image and image illegibility can be overcome. Therefore, there arises a requirement for an apparatus which is capable of simultaneously displaying images at a plurality of angles.

SUMMARY OF THE INVENTION

In view of the foregoing, an object of the present invention is to provide a signal reproducing apparatus and a signal reproducing method which enable seamless images at a plurality of angles recorded on a recording medium to simultaneously be watched or instantaneously be watched even if the angle is switched.

To achieve the above-mentioned object, according to one aspect of the present invention, there is provided a signal reproducing apparatus including: decoding means for generating decoded image data at the plural angles by decoding coded image data at a certain angle among the plural angles read by reading means; decoding storage means on which decoded image data at the certain angle among the plural angles generated by the decoding means is stored; displaying storage means having storage regions on which image data to be displayed is stored and which enables division display to be performed; and control means for subjecting decoded image data stored in the decoding storage means to a contraction process, writing decoded image data, which has been subjected to the contraction process, on the storage region of the displaying storage means and reading image data to be displayed and including decoded image data written on the storage region. Since the signal reproducing apparatus has the above-mentioned structure, a plurality of decoded image data items are stored in the storage regions of the displaying storage means.

To achieve the above-mentioned object, according to another aspect of the present invention, there is provided a signal reproducing apparatus including: m storage means on which coded image data read by reading means is stored; and decoding means for generating decoded image data by decoding coded image data transmitted from the m storage means. Since the signal reproducing apparatus according to the present invention has the above-mentioned elements, the signal reproducing apparatus simultaneously decodes coded image data at a plurality of angles or decodes by switching images.

To achieve the above-mentioned object, according to another aspect of the present invention, there is provided a signal reproducing method including: a decoding step for generating decoded image data at the plural angles by decoding coded image data at a certain angle among the plural angles read in a reading step; a decoded image data storing step for storing decoded image data at the certain angle among the plural angles generated in the decoding step; a displaying storage step using storage regions on which image data to be displayed is stored and which enables division display to be performed; and a control step for subjecting decoded image data stored in the decoded image data storing step to a contraction process, writing decoded image data, which has been subjected to the contraction process, on the storage region which is used in the displaying storage step and reading image data to be displayed and including decoded image data written on the storage region.

To achieve the above-mentioned object, according to another aspect of the present invention, there is provided a signal reproducing method including: m storing steps for storing coded image data read in a reading step; and a decoding step for generating decoded image data by decoding coded image data transmitted from the m storing steps.

Other objects, features and advantages of the invention will be evident from the following detailed description of the preferred embodiments described in conjunction with the attached drawings.

BRIEF DESCRIPTION OF THE DRAWINGS

FIG. 4 is a diagram showing a state in which coded image data is decoded, in particular, an I picture and a P picture are decoded in the frame memory;

DESCRIPTION OF THE PREFERRED EMBODIMENTS

Embodiments of the present invention will now be described with reference to the drawings.

A first embodiment will now be described. In this embodiment, a DVD reproducing apparatus will now be described to which a signal reproducing apparatus and a signal reproducing method according to the present invention are applied so as to be capable of reproducing a DVD (Digital Video Disk: DVD-VIDEO).

The DVD is a recording medium on which images compressed and coded in accordance with MPEG2 (Moving Picture Coding Experts Group 2) are recorded. Data for forming image data which is recorded on the DVD reproducing apparatus is composed of I pictures consisting of intra-frame coded images, P pictures consisting of inter-frame images which have between predictively coded in the preceeding direction and B pictures consisting of bidirectional predictively coded images.

The I picture is coded image data which can be generated by compressing and coding one image without a predictive coding process. The I picture generates an image by decoding only data thereof. The P picture is coded image data which is generated by predictively coding an image in a previous frame. The B picture is coded image data generated by predictively coding images in preceeding and following frames.

When data is decoded, the I picture does not require the other coded image data. Each of the P picture and the B picture requires one or two other coded image data items. Coded image data is decoded by a data decoder on a frame memory of the DVD reproducing apparatus.

Figure 1:
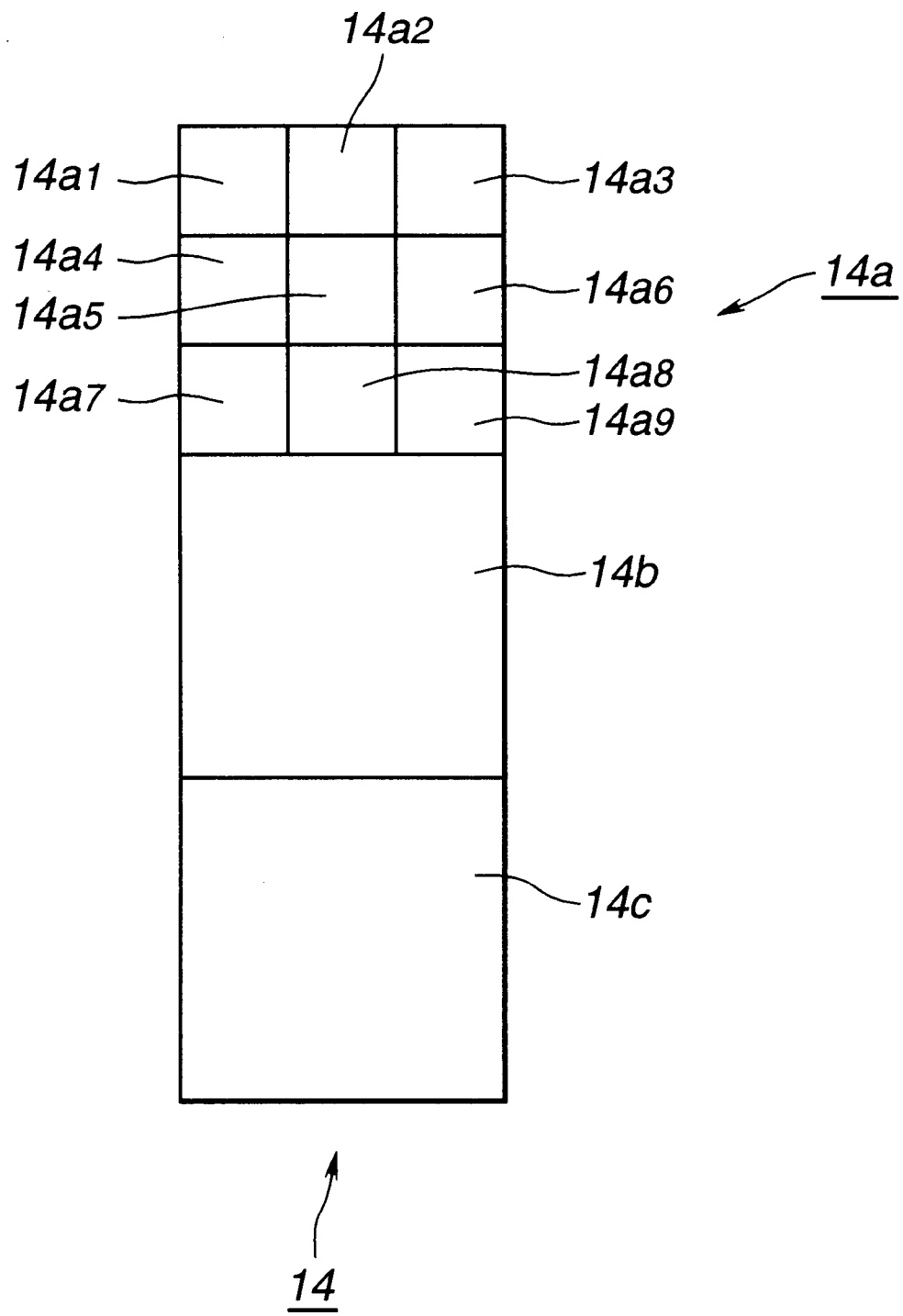
FIG. 1 is a diagram showing the structure of a frame memory of a DVD reproducing apparatus according to a first embodiment of the present invention.

As shown in FIG. 1, the DVD reproducing apparatus for reproducing the DVD has a frame memory 14 for use when a decoding is performed, the frame memory 14 being sectioned into three regions. The frame memory 14 has a display data storage region 14a having nine storage regions corresponding to nine different images, for example, images at nine angles to be displayed. Moreover, the frame memory 14 has a first decoded data storage region 14b and a second decoded data storage region 14c in each of which decoded I pictures and P pictures, that is, decoded image data is stored.

As described above, I pictures and P pictures are stored in the first and second decoded data storage regions 14b and 14c. When, for example, P picture is decoded, the P picture is stored in either of the first decoded data storage region 14b or the second decoded data storage region 14c. The decoded image data of decoded I picture or P picture stored in the other decoded data storage region is used to perform the decoding process.

Decoded image data composed of the I picture or the P picture decoded in the first decoded data storage region 14b or the second decoded data storage region 14c is subjected to a contraction process, and then stored in the sectioned region in the display data storage region 14a.

The display data storage region 14a is a region in which image data to be displayed is stored. The display data storage region 14a has nine sectioned regions $14_{a1}, 14_{a2}, 14_{a3}, 14_{a4}, 14_{a5}, 14_{a6}, 14_{a7}, 14_{a8}$ and $14_{a9}$ corresponding to images at nine angles. Thus, decoded image data subjected to the contraction process is stored in each of the above-mentioned regions.

When display image data is reproduced, image data in the display data storage region 14a is reproduced on, for example, a monitor. The structure of the display data storage region 14a may arbitrarily be determined. Decoded image data stored in the storage region having the determined structure is, by dint of display image data, reproduced in a portion of a display screen of the monitor or the like corresponding to the storage region.

When the reproducing process is performed to execute, for example, the multi-angle function, decoded image data forming images at angles at the same time is stored in each region. For example, decoded image data items of images at first to ninth angles are assigned and stored in the nine regions.

Since the DVD reproducing apparatus has the above-mentioned frame memory 14, the DVD reproducing apparatus is able to decode coded image data which forms the images at a plurality of angles stored in the DVD and simultaneously display decoded images on a plurality of display portions of, for example, the monitor.

Figure 2:
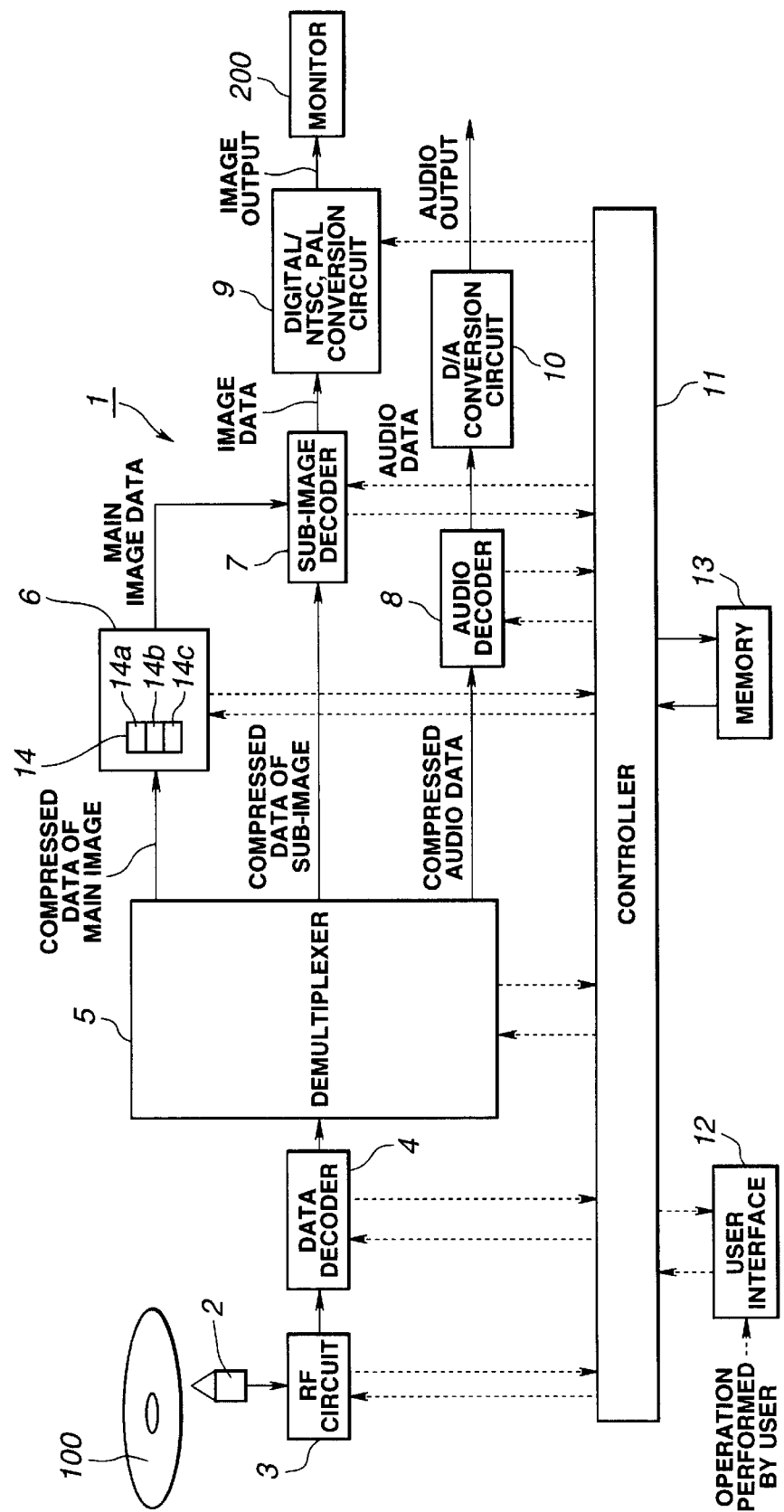
FIG. 2 is a circuit diagram showing the DVD reproducing apparatus according to the first embodiment.

The frame memory 14 of the DVD reproducing apparatus 1 having the structure as shown in FIG. 2 will now be described. The DVD reproducing apparatus 1 has a pickup 2 for reproducing an RF signal from a recording medium (DVD) 100, an RF circuit 3 to which the RF signal reproduced by the pickup 2 is supplied and which binary-codes the RF signal. Moreover, the DVD reproducing apparatus has a data decoder 4 to which reproduced data is supplied from the RF circuit 3 and which subjects reproduced data to a decoding process including an error correction process. In addition, the DVD reproducing apparatus has a demultiplexer 5 for dividing reproduced data subjected to the decoding process into compressed data of a main image, compressed data of a sub-image and compressed audio data.

Note that compressed data of a main image is composed of decoded image data, such as I picture, P pictures and B pictures.

The DVD reproducing apparatus 1 has a video decoder 6 provided with the frame memory 14 and arranged to decode compressed data of the main image transmitted from the demultiplexer 5, a sub-image decoder 7 which decodes compressed data of the sub-image and synthesizes decoded data and main image data and an audio decoder 8 for decoding compressed audio data. Moreover, the DVD reproducing apparatus 1 has a digital/NTSC or PAL conversion circuit (hereinafter simply called as an "NTSC conversion circuit") 9 to which data obtained by synthesizing data of the sub-image and data of the main image is supplied from the sub-image decoder 7 and which converts supplied image data into NTSC signal or a PAL signal. In addition, the DVD reproducing apparatus 1 has a digital/analog conversion circuit (hereinafter simply called as a "D/A" conversion circuit) 10 which is supplied with audio data from the audio decoder 8 and which converts audio data into an analog signal.

Moreover, the DVD reproducing apparatus 1 has a controller 11 for controlling the above-mentioned pickup 2, the RF circuit 3, the data decoder 4, the demultiplexer 5, the video decoder 6, the sub-image decoder 7, the audio decoder 8, the NTSC conversion circuit 9 and the D/A conversion circuit 10. Moreover, the DVD reproducing apparatus 1 has a user interface 12 serving as an interface between the controller 11 and input performed by a user. In addition, the DVD reproducing apparatus 1 has a memory 13 serving as a data storage portion for the controller 11.

The NTSC signal or the PAL signal supplied from the NTSC conversion circuit 9 and transmitted from the DVD reproducing apparatus 1 is supplied to a monitor 200 so that the image is displayed.

Figure 14:
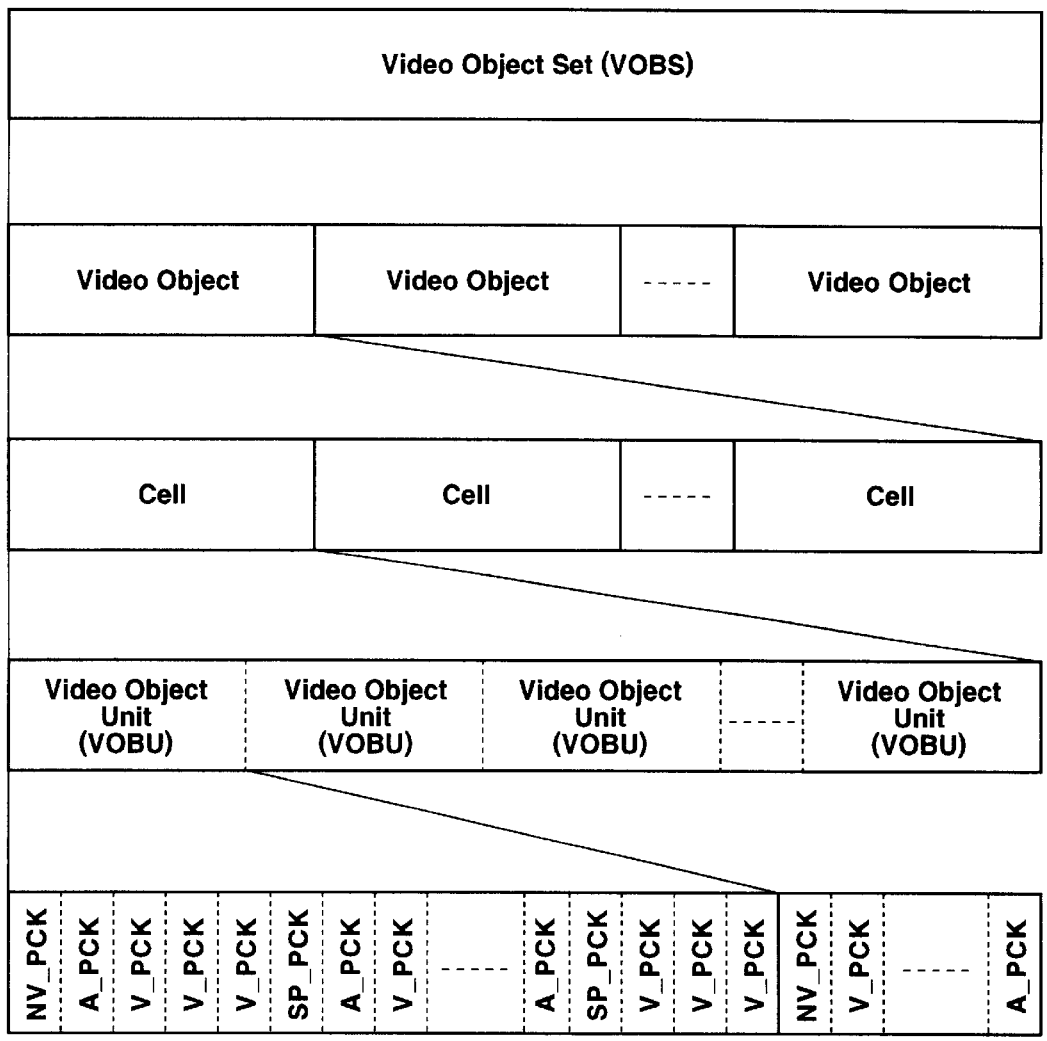
FIG. 14 is a diagram showing a data format for a DVD which is reproduced by the DVD reproducing apparatus according to any one of the first to fourth embodiments.

The recording medium 100 arranged to be reproduced by the DVD reproducing apparatus 1 is, as shown in FIG. 14, called a Video Object Set (hereinafter called as a "VOBS") which is one unit on which one title of a motion picture or the like is recorded.

The VOBS is composed of a plurality of video objects (hereinafter called "VOBs"). The DVD is structured to correspond to the multi-story function which enables, for example, a plurality of stories of one motion picture to be watched. Specifically, VOBs cause different stories to be developed. The VOB is composed of a plurality of Cells.

The Cell serves as, for example, a unit for one scene of a motion picture. That is, combinations of scenes form the VOB. The difference of the combination is used to realize the multi-story function. The Cell is composed of a plurality of Video Object Units (hereinafter called "VOBUs").

The VOBU is composed of a plurality of groups of compressed data of a main image, compressed data of a sub-image and compressed audio data. The compressed data of a main image, compressed data of a sub-image and compressed audio data are packed into a main image pack (V_PCK), a sub-image pack (SP_PCK) and the audio pack (A_PCK), respectively, and then transmitted from the demultiplexer 5.

The compressed data of a main image is data which is the main image of the motion picture, the compressed data of a main image forming a video stream in a DVD format. Compressed data of a sub-image is data of subtitles or the like, compressed data of a sub-image forming a sub-picture stream in the DVD format. Compressed audio data is data of voice, compressed audio data forming an audio stream in the DVD format.

Figure 15:
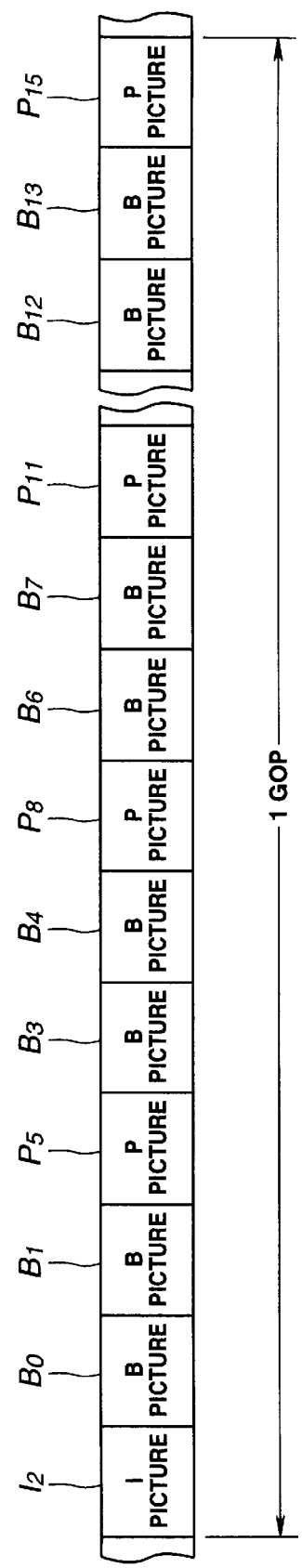
FIG. 15 is a diagram showing a data format for GOP recorded on the DVD.

In the MPEG2, GOP (Group of Picture) in the DVD is in the form of an angle block composed of sectioned image data at each angle. An interleave structure is employed so that angle blocks are mixed when recorded on the DVD. The GOP is recorded in the VOB by dint of the interleave structure. One GOP is usually composed of I pictures, P pictures and B pictures, as shown in FIG. 15. The total of the I pictures, the P pictures and the B pictures is fifteen.

Data recorded on the recording medium (DVD) 100 in the above-mentioned format is read by the pickup 2 provided for the DVD reproducing apparatus 1.

The pickup 2 irradiates the signal recording surface of the recording medium 100 with a laser beam emitted from a laser beam source included in the pickup 2 so as to receive light reflected by the signal recording surface. Then, the pickup 2 supplies an RF signal reproduced in response to received light to the RF circuit 3.

The RF circuit 3 equalizes the waveform of the RF signal and binary-codes the RF signal so as to generate reproduced data, a synchronizing signal of reproduced data and the like. Digital data and the like generated by the RF circuit 3 are supplied to the data decoder 4.

The data decoder 4 performs processes for demodulating and correcting data in accordance with reproduced data generated by the RF circuit 3. Digital data subjected to the demodulation and the like by the data decoder 4 is supplied to the demultiplexer 5.

Digital data includes compressed data of a man image. Therefore, coded image data is read from the recording medium 100 by the pickup 2, the RF circuit 3 and the data decoder 4.

The demultiplexer 5 divides digital data subjected to the decoding process including the error correction process by the data decoder 4 and reproduced from the recording medium 100 into various packs, that is, the main image pack, the sub-image pack or the audio pack so as to supply the packs to each decoder disposed in the after of the demultiplexer 5.

A track buffer is disposed between the demultiplexer 5 and the data decoder 4 in order to absorb the difference between the processing speed of the demultiplexer 5 and that of the data decoder 4.

The demultiplexer 5 supplies, to the video decoder 6, the main image pack composed of compressed data of the main image, supplies, to the sub-image decoder 7, the sub-image pack composed of the compressed pack of the sub-image and supplies, to the audio decoder 8, the audio pack composed of the compressed audio pack.

The video decoder 6 subjects compressed data of the main image in the supplied main image pack to a decoding process so as to generate decompressed main image data. Note that main image data is decoded image data composed of decoded I pictures, P pictures and B pictures. The video decoder 6 has the frame memory 14 so as to perform the decoding process.

The decoding process which is performed by the video decoder 6 by using the frame memory 14 will now be described. A specific case will now be described in which I pictures and P pictures of an image at, for example, a ninth angle in the VOBU are decoded so as to perform reproduction. Description will be made about the process for decoding the I picture in such a manner that I picture $I_2$ in the first VOBU and the second VOBU are sequentially decoded. The process for decoding the I picture and the P picture which will now be described is a process for sequentially decoding I picture $I_2$, P picture $P_5$ and P picture $P_8$ in the first VOBU.

Figure 3C:
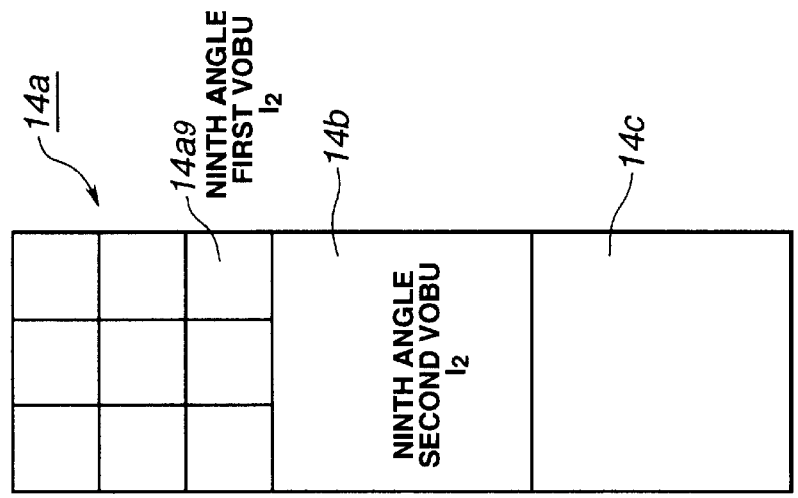
FIG. 3 is a diagram showing a state in which coded image data is decoded, in particular, an I picture is decoded in the frame memory.
Figure 3B:
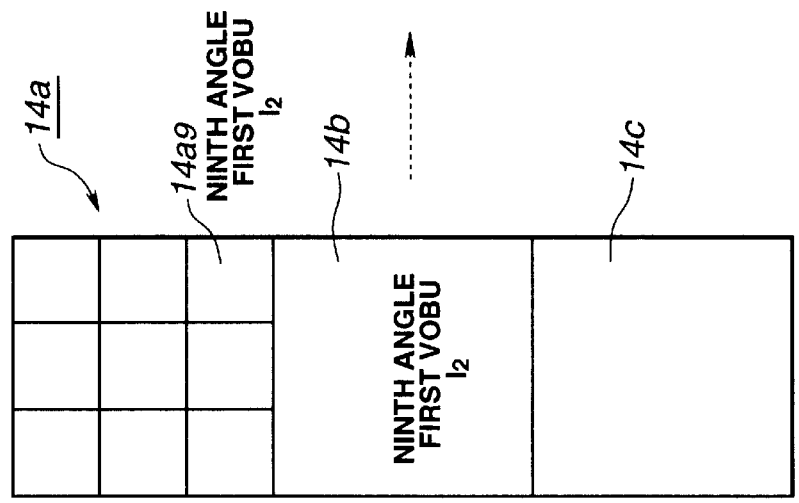
Figure 3A:
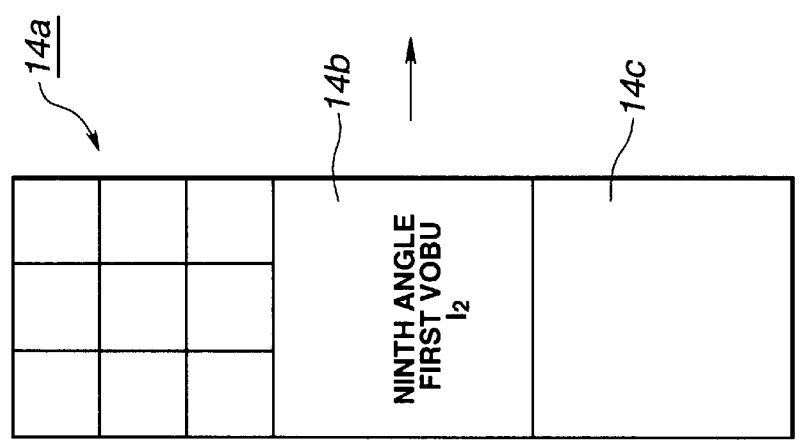
Figures 5A, 5B, 5C, 5D:
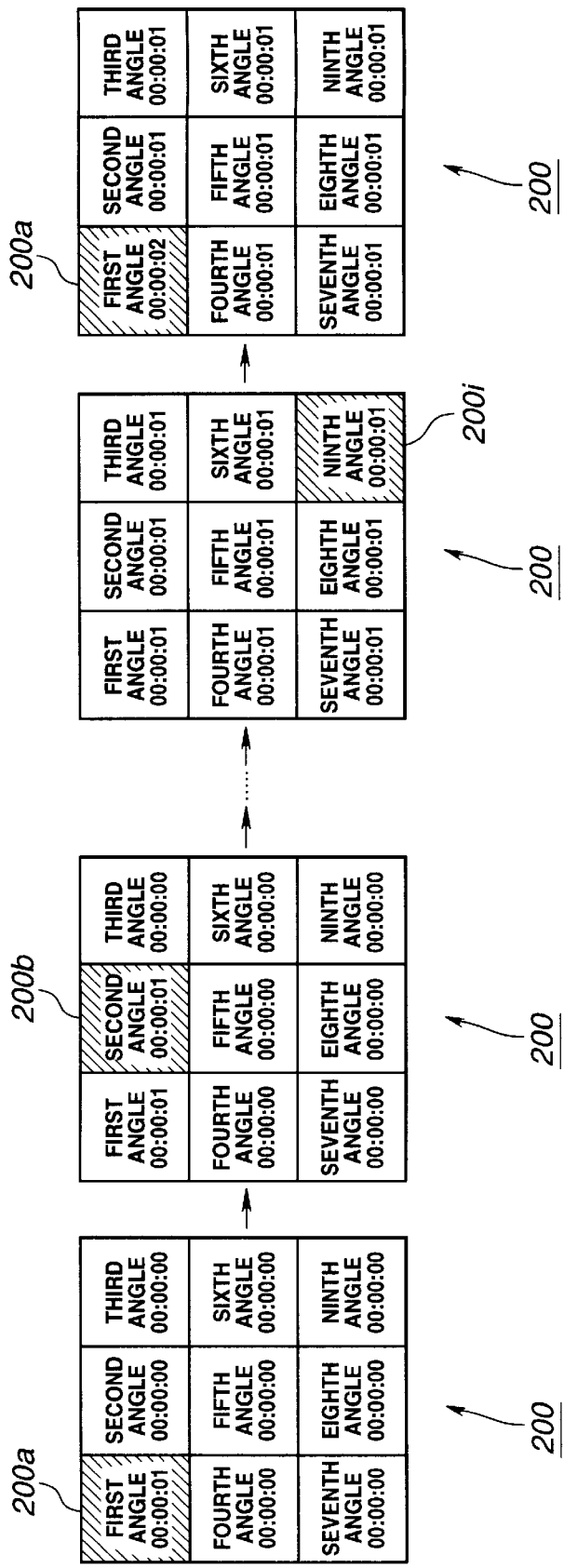
FIG. 5 is a plan view showing a monitor employed when the procedure for decoding coded image data has been described.

When only the I picture is decoded, the video decoder 6 decodes I picture $I_2$ of I pictures forming supplied compressed data of the main image, as shown in FIG. 3A so as to store decoded I picture $I_2$ in the first decoded data storage region 14*b* of the frame memory 14. The video decoder 6 decodes I picture $I_2$ while writing it on, for example, the first decoded data storage region 14*b*.

After the decoding process has been performed, the video decoder 6 subjects the decoded I picture $I_2$ to a contraction process, as shown in FIG. 3B. Then, the I picture $I_2$ contracted and subjected to the contraction process is copied to the displaying region 14$_{a9}$ for the ninth angle in the display data storage region 14*a*.

The contracted I picture $I_2$ stored in the display data storage region 14*a* is displayed on one of sectioned display portion of the monitor 200 through the sub-image decoder 7 and the NTSC conversion circuit 9.

The DVD reproducing apparatus 1 displays an image formed by the decoded I picture $I_2$. Moreover, a next I picture, that is, I picture $I_2$ recorded in the second VOBU is stored in the first decoded data storage region 14*b* of the frame memory 14, as shown in FIG. 3C. Similarly to the process to which the I picture $I_2$ in the first VOBU has been subjected, the video decoder 6 decodes the I picture $I_2$ in the second VOBU. Then, the decoded I picture $I_2$ is subjected to the contraction process, and then copied to the display data storage region 14*a*.

The I picture $I_2$ in the second VOBU contracted as described above and copied to the display data storage region 14*a* is displayed on the monitor 200, the I picture $I_2$ being displayed as an image next to the I picture $I_2$ in the first VOBU. Specifically, decoded image data (main image data) obtained by the video decoder 6 as a result of the decoding process is supplied to the sub-image decoder 7.

The sub-image decoder 7 decodes compressed data of the sub-image in the supplied sub-image pack, and then synthesizes decoded sub-image data with main image data supplied from the video decoder 6 so as to generate image data. That is, the sub-image decoder 7 synthesizes data of subtitles reproduced as sub-image data with main image data. If no sub-image data exists, the sub-image decoder 7 as it is transmits main image data. The sub-image decoder 7 supplies generated image data to the NTSC conversion circuit 9.

The NTSC conversion circuit 9 converts image data from digital data into NTSC or PAL television signal. The television signal supplied from the NTSC conversion circuit 9 is displayed on the monitor 200 as an image.

The television signal supplied to the monitor 200 includes I picture $I_2$ decoded by the video decoder 6. The display screen of the monitor 200 is divided into nine sections corresponding to the plurality of the sectioned storage regions of the display data storage region 14*a* of the frame memory 14. The division display is performed in accordance with the division structure of the display storage region. Therefore, an image formed by the I picture $I_2$ is displayed on one of the sectioned display portions of the monitor 200.

The audio decoder 8 decodes compressed audio data in the audio pack so as to generate decompressed audio data. If audio data has been compressed by the MPEG2 method, the audio decoder 8 performs a corresponding decompressing process so as to generate compressed audio data. If the format is linear PCM or Dolby AC3, the audio decoder 8 performs a corresponding process. The audio decoder 8 supplies generated audio data to the D/A conversion circuit 10.

The D/A conversion circuit 10 converts audio data, which is digital data, into analog audio data, and then transmits analog audio data. The transmitted analog audio data is supplied to a loud speaker unit or the like so that a user is able to watch the image reproduced from the recording medium 100.

The controller 11 controls the pickup 2, the RF circuit 3, the data decoder 4, the demultiplexer 5, the video decoder 6, the sub-image decoder 7, the audio decoder 8, the NTSC conversion circuit 9 and the D/A conversion circuit 10. The controller 11 permits input from the user interface 12 which is an operation panel or a remote controller. In accordance with the input, the controller 11 controls each circuit.

The controller 11 controls writing and reading data to and from the frame memory 14 through the video decoder 6. That is, the controller 11 subjects decoded image data stored in the decoded data storage region of the frame memory 14 to the contraction process and controls the processing of writing one of contracted and decoded image data item on one of storage regions of the display data storage region 14*a* formed to perform the division display. The controller 11 controls a process for reading decoded image data stored in the display data storage region 14*a*.

The process for reading decoded image data from the display data storage region 14*a* is performed in such a manner that image data to be displayed is read in units of the regions in the display data storage region 14*a*. An image composed of decoded image data stored in one of the storage regions corresponding to the regions of the monitor 200 is displayed on a display position of the monitor 200 corresponding to the storage region.

The decoding and contraction processes to which the I picture at the ninth angle are performed for the I pictures at the first to eighth angles. Thus, the DVD reproducing apparatus 1 is able to simultaneously display, on the monitor 200, images at first to eighth angles at the same time as the image at the ninth angle. In this case, coded image data for forming the image at each angle is performed in a sequential order as an image (200a) at the first angle, an image (200b) at the second angle, . . . , an image (200i) at the ninth angle and an image (200a) at the first angle, as shown in FIGS. 5A to 5D.

When only I pictures are decoded, the frame memory 14 is required to have at least one storage region for use in the decoding process, as described above.

When I pictures and P pictures are decoded, the video decoder 6 initially decodes supplied I picture $I_2$ so as to be stored in the first decoded data storage region 14b of the frame memory 14, as shown in FIG. 4A.

After the video decoder 6 has decoded I picture $I_2$, the video decoder 6 contracts the decoded I picture $I_2$, and then copies contracted and decoded I picture $I_2$ to the display data storage region $14_{a9}$ at the ninth angle in the display data storage region 14a, as shown in FIG. 4B.

An image formed by the I picture $I_2$ contracted and stored in the display data storage region 14a is displayed on a display portion of the monitor 200 corresponding to the display data storage region 14a of the frame memory 14.

On the other hand, the video decoder 6 predicts and decodes P picture $P_5$ supplied subsequently with the decoded I picture $I_2$ stored in the first decoded data storage region 14b so as to store decoded P picture $P_5$ on the second decoded data storage region 14c, as shown in FIG. 4C. After the video decoder 6 has stored decoded P picture $P_5$ on the second decoded data storage region 14c, the video decoder 6 contracts the decoded P picture $P_5$, and then copies the contracted and decoded P picture $P_5$ to the region $14_{a9}$ of the display data storage region 14a, as shown in FIG. 4D.

An image formed by the P picture $P_5$ contracted and stored on the display data storage region 14a is displayed next to the I picture $I_2$ which has been displayed in one display portion of the monitor 200.

When P picture $P_8$ is decoded, the video decoder 6, as shown in FIG. 4E, predicts and decodes P picture $P_8$ supplied subsequently with the decoded P picture $P_5$ stored in the second decoded data storage region 14c, and then stores decoded P picture $P_8$ on the first decoded data storage region 14b.

After the decoded P picture $P_8$ has been stored on the first decoded data storage region 14b, the video decoder 6, as shown in FIG. 4F, contracts the decoded P picture $P_8$, and then copies the contracted and decoded P picture $P_8$, to the region $14_{a9}$ of the display data storage region 14a.

An image formed by the P picture $P_8$ contacted and stored on the display data storage region 14a is displayed as an image next to the P picture $P_5$ which has been displayed on one display portion of the monitor 200.

Thus, images formed by the decoded I pictures and P pictures are sequentially displayed on one display portion of the monitor 200.

The DVD reproducing apparatus 1 similarly subjects I pictures and P pictures at the first to eighth angles to the decoding and contraction processes to which the I picture and the P picture at the ninth angle have been subjected. Thus, the DVD reproducing apparatus 1 is able to display images at the first to eighth angles at the same time as the image at the ninth angle on the corresponding display portions of the monitor 200.

The following reproduction which is performed by decoding only the I picture or the I picture and the P picture is performed when, for example, high speed reproduction is performed. If a usual reproduction is performed, a storage region for decoding is required for the frame memory 14.

The DVD reproducing apparatus 1 is able to perform a reverse directional reproduction. Moreover, the DVD reproducing apparatus 1 is able to display images at the first to ninth angles at the same time on the monitor 200. The reverse reproduction using the I picture is performed in such a manner that, for example, I picture in n-th VOBU is decoded, and then I picture in n−1 th VOBU is decoded. As described above, I pictures in the GOP are decoded.

When reverse reproduction using I pictures and P pictures is performed, the I picture is initially decoded in the first decoded data storage region 14b. In accordance with the decoded I picture, the P picture is decoded in the second decoded data storage region 14c. For example, I picture $I_2$ is decoded in the first decoded data storage region 14b. In accordance with the decoded I picture $I_2$, the P picture $P_5$ in the same VOBU is decoded in the second decoded data storage region 14c. The decoding process is performed as described above in such a manner that the sequential displaying order on the monitor 200 is inverted. That is, the reverse reproduction is performed in such a manner that the P picture $P_5$ and the I picture $I_2$ are reproduced in this sequential order.

An operation of the DVD reproducing apparatus 1 for decoding I pictures and P pictures forming, for example, the ninth angle on the frame memory 14 structured to permit the reverse reproduction will now be described.

Figure 6:
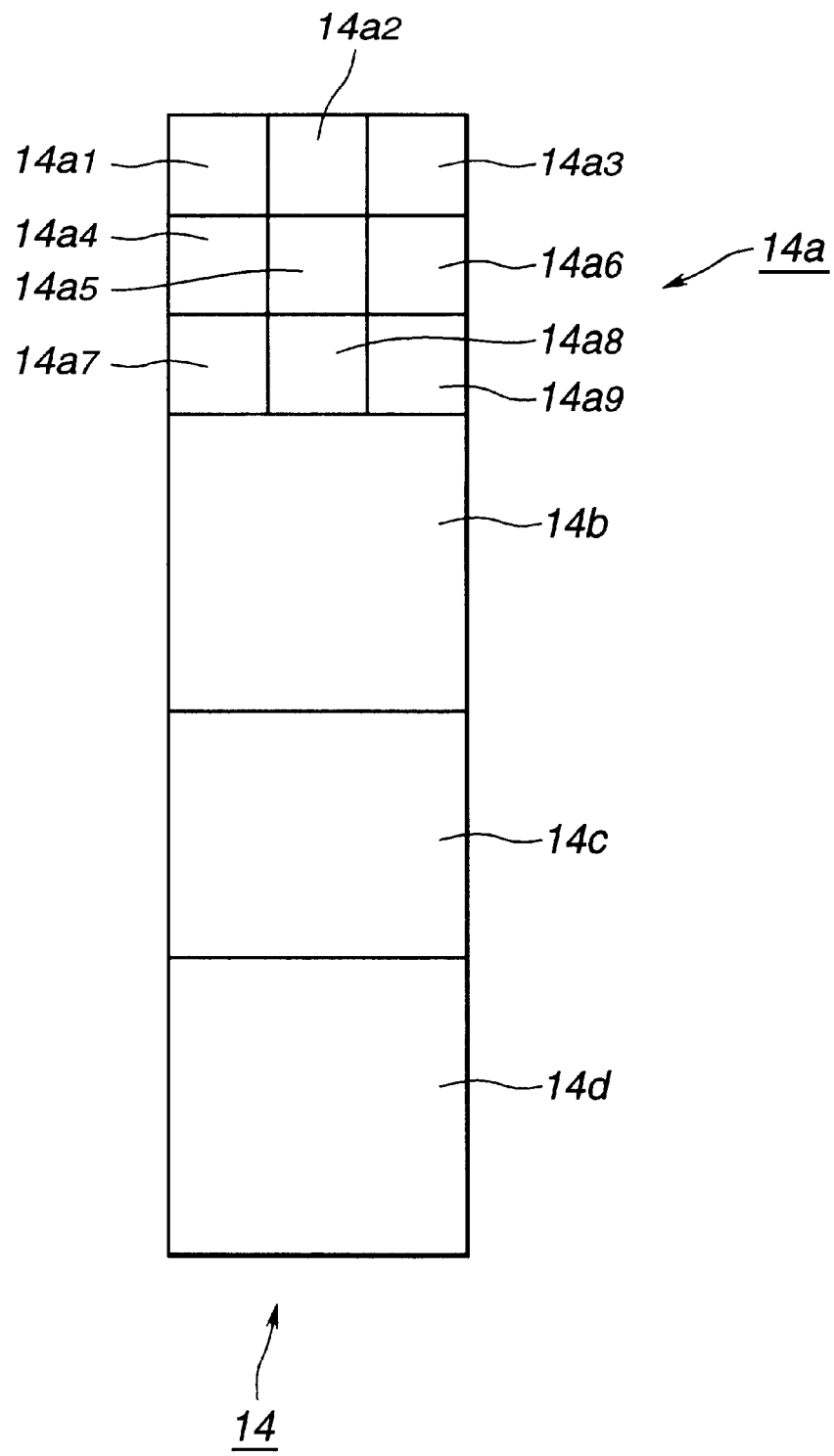
FIG. 6 is a diagram showing the frame memory structured to perform reverse reproduction.

The frame memory 14 permitting the reverse reproduction, as shown in FIG. 6, includes a display data storage region 14a having nine storage regions, a first decoded data storage region 14b on which decoded image data of the I picture or the P picture is stored and a second decoded data storage region 14c and a third decoded image data storage region 14d. That is, the third decoded image data storage region 14d is provided for the frame memory 14 to enable the reverse reproduction.

Figures 7A, 7B, 7C, 7D, 7E, 7F:
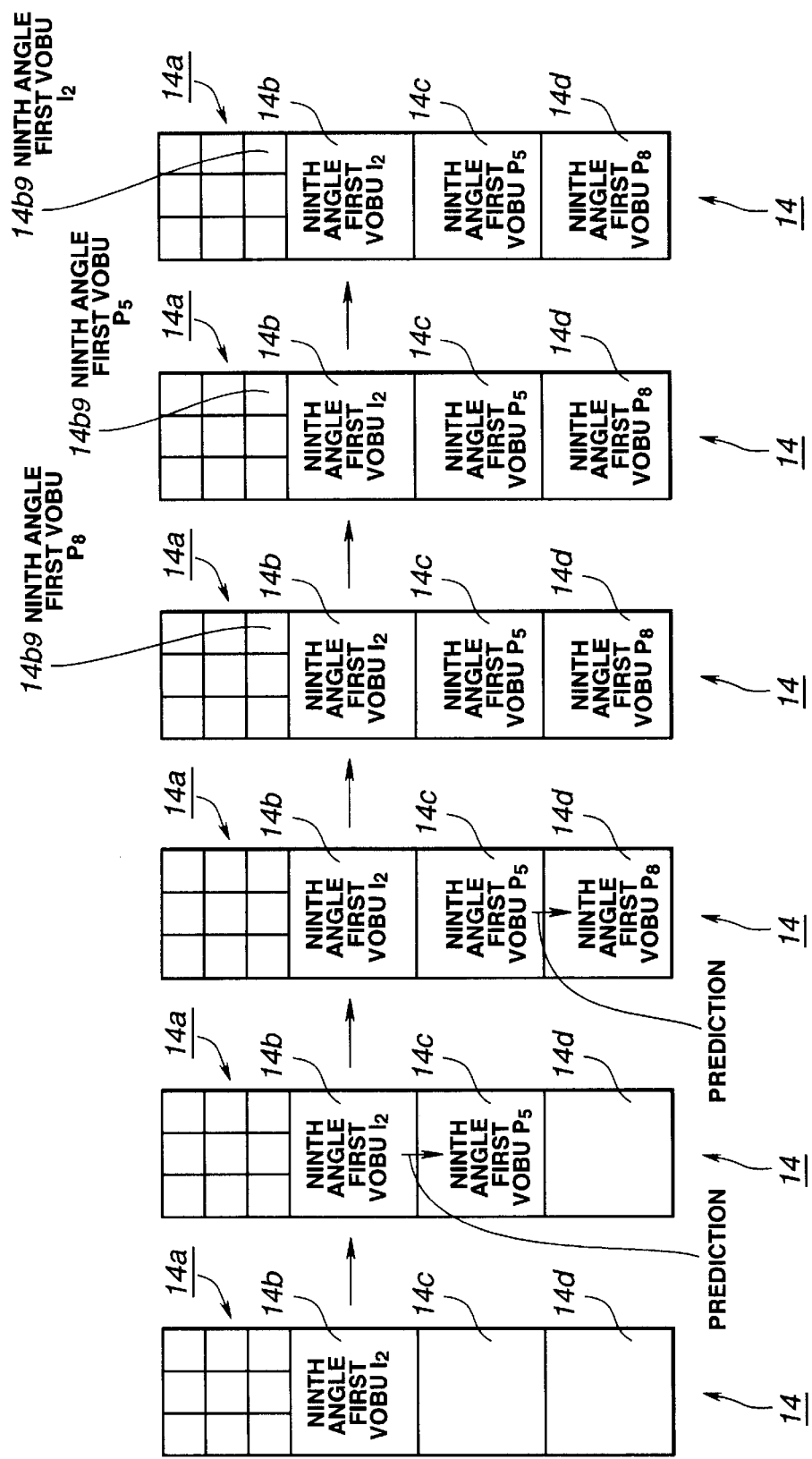
FIG. 7 is a diagram showing a state in which coded image data is decoded, in particular, an I picture and a P picture are decoded in the frame memory structured to perform the reverse reproduction.

When a reverse reproduction process is performed, the supplied I picture $I_2$ is decoded and stored in the first decoded data storage region 14b of the frame memory 14, as shown in FIG. 7A.

Then, as shown in FIG. 7B, the video decoder 6 performs prediction using the decoded I picture $I_2$ stored in the first decoded data storage region 14b so as to decode the P picture $P_8$ supplied subsequently. Then, the video decoder 6 stores the decoded P picture $P_8$ on the second decoded data storage region 14c.

Then, as shown in FIG. 7C, the video decoder 6 performs prediction using the decoded P picture $P_5$ stored in the second decoded data storage region 14c so as to decode the P picture $P_8$ supplied subsequently. Then, the video decoder 6 stores the decoded P picture $P_8$ on the third decoded image data storage region 14d.

Each of the decoded data items is copied to the display data storage region 14a in an order opposite to the order in which the decoding process has been performed. That is, as shown in FIG. 7D, the decoded P picture $P_8$ stored in the third decoded image data storage region 14d is contracted. The P picture $P_8$ decoded and contracted as described above is copied to the region $14_{a9}$ of the display data storage region 14a for displaying the ninth angle.

As shown in FIG. 7E, the decoded P picture $P_5$ stored in the second decoded data storage region 14c is contracted. Then, the contracted and decoded P picture $P_5$ is copied to the region $14_{a9}$ of the display data storage region 14a.

As shown in FIG. 7F, the decoded I picture $I_2$ stored in the first decoded data storage region 14b is contracted. Then, the contracted and decoded I picture $I_2$ is copied to the region $14_{a9}$ of the display data storage region 14a.

As described above, the P picture $P_8$, the P picture $P_5$ and the I picture $I_2$ are sequentially copied to the region 14 of the display data storage region 14a. Thus, the DVD reproducing apparatus 1 is able to sequentially display the P picture $P_8$, the P picture $P_5$ and the I picture $I_2$ on one display portion of the monitor 200 corresponding to the region $14_{a9}$. The reverse reproduction which is performed by decoding only the I pictures and the P pictures is employed when, for example, high-speed reverse reproduction is performed. If usual reverse directional reproduction is performed, only second decoded data storage region is required to be provided for the frame memory 14.

As described above, the frame memory 14 is structured to perform a process for decoding the I pictures or the I picture and the P picture. The reverse reproduction is performed by using the frame memory 14 as described above.

Since the DVD reproducing apparatus 1 has the frame memory 14 structured as described above, the DVD reproducing apparatus 1 is able to simultaneously display images at a plurality of angles at the same time in both of the preceeding directional reproduction and the reverse reproduction.

As a result, the problem which arises when an image is switched seamlessly in that an image at another angle is missed at the instant that the switching is performed can be overcome. For example, a user is able to watch a seamless image and simultaneously watch an image at another angle.

The image at the angle required to be reproduced is not limited to the seamless image. The image may be a non-seamless image.

The image at each angle is formed in VOBU units. Moreover, the image at each angle at the same time has an attribute among VOBUs. That is, the DVD reproducing apparatus 1 decodes the pictures in the VOBUs made to correspond to each other when the image at each angle is reproduced.

The function of the DVD reproducing apparatus 1 is not limited to the above-mentioned operation. When a preceeding directional reproduction is performed in such a manner that a picture of an image at another angle is decoded, the DVD reproducing apparatus 1 is able to decode a picture forming an image at the other angle in the VOBU belonging to next time. When the DVD reproducing apparatus 1 performs reverse reproduction in such a manner that a picture of an image at another angle is decoded, the DVD reproducing apparatus 1 is able to decode a picture forming an image at the other angle in the VOBU belonging to real time.

A second embodiment of the present invention will now be described. A DVD reproducing apparatus according to the second embodiment has a structure to which the signal reproducing apparatus and the signal reproducing method according to the present invention are applied so as to reproduce a DVD.

The DVD has a data format having a multi-angle function similarly to that according to the first embodiment. That is, the DVD employs the MPEG2 method and has images stored thereon in such a manner that the images are compressed and coded as I pictures, P pictures and B pictures. Then, a process for reproducing a DVD on which images at two different angles have been recorded will now be described.

Figure 8:
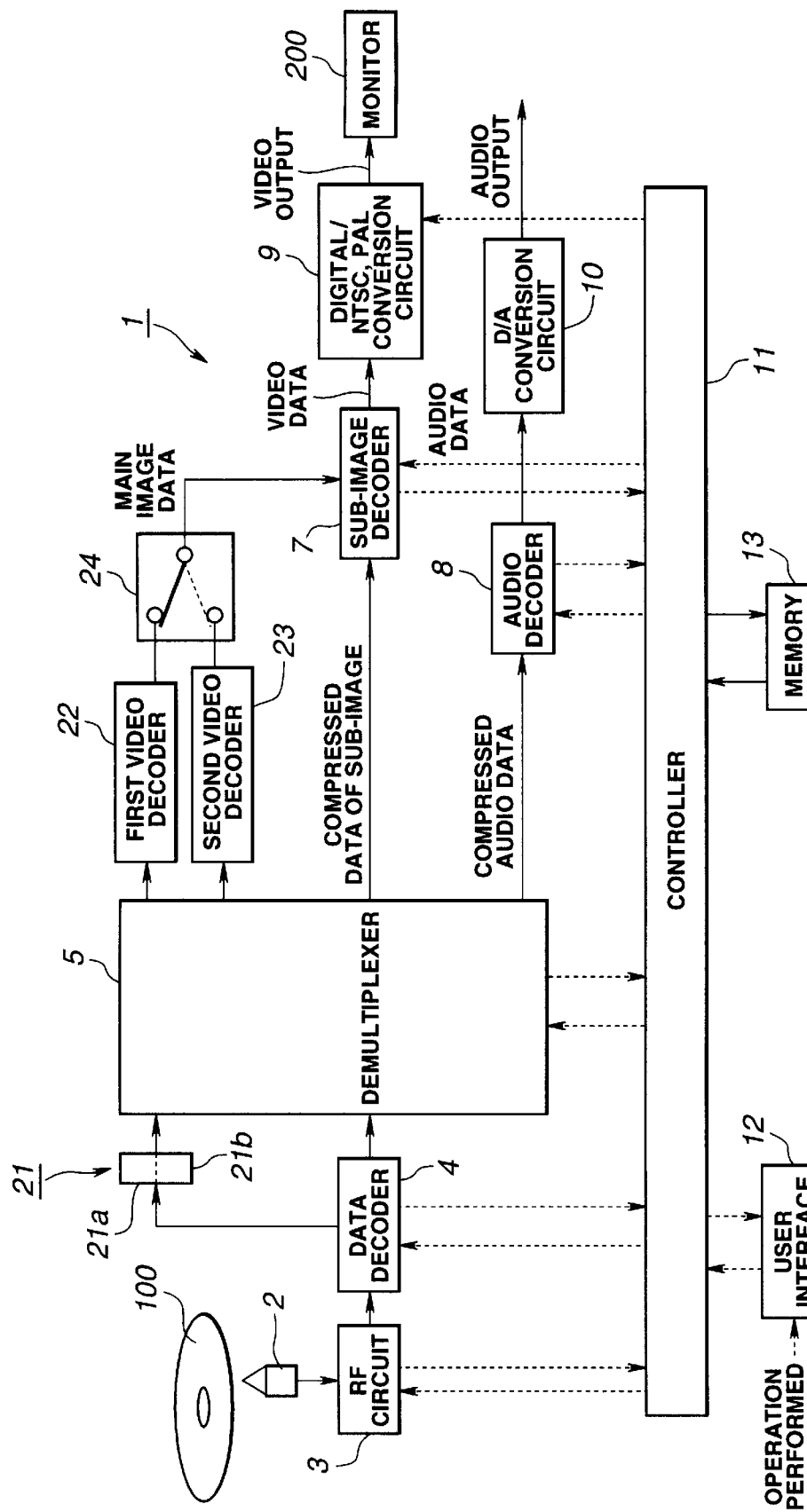
FIG. 8 is a circuit diagram showing a DVD reproducing apparatus according to a second embodiment of the present invention.

The DVD reproducing apparatus according to this embodiment, as shown in FIG. 8, has two video decoders. Thus, decoded image data obtained by dint of decoding processes performed by the two video decoders is switched when decoded image data is transmitted to a following circuit.

Specifically, the DVD reproducing apparatus 1 has a pickup 2 for reproducing an RF signal from a recording medium 100, and an RF circuit 3 to which the RF signal reproduced by the pickup 2 is supplied and which binary-codes the RF signal. Moreover, the DVD reproducing apparatus has a data decoder 4 to which reproduced data is supplied from the RF circuit 3 and which subjects reproduced data to a decoding process including an error correction process. In addition, the DVD reproducing apparatus 1 has a track buffer 21 which has first and second storage regions 21a and 21b and on which digital data transmitted from the data decoder 4 is stored. Moreover, the DVD reproducing apparatus 1 has a demultiplexer 5 for dividing digital data subjected to the decoding process by the data decoder 4 into compressed data of a main image, compressed data of a sub-image and compressed audio data.

Moreover, the DVD reproducing apparatus 1 has first and second video decoders 22 and 23 for decoding compressed data of the main image transmitted from the demultiplexer 5; a sub-image decoder 7 which decodes compressed data of the sub-image so as to synthesize decoded compressed data of the sub-image with data of the main image; an audio decoder 8 for decoding compressed audio data; and a digital/NTSC or PAL conversion circuit (hereinafter simply called as an "NTSC conversion circuit") 9 to which data obtained by synthesizing data of the sub-image and data of the main image is supplied from the sub-image decoder 7 and which converts supplied image data into NTSC signal or a PAL signal. In addition, the DVD reproducing apparatus 1 has a digital/analog conversion circuit (hereinafter simply called as a "D/A" conversion circuit) 10 which is supplied with audio data from the audio decoder 8 and which converts audio data into an analog signal.

Moreover, the DVD reproducing apparatus 1 includes a controller 11 for controlling the pickup 2, the RF circuit 3, the data decoder 4, the demultiplexer 5, the first video decoder 22, the second video decoder 23, a switch 24, the sub-image decoder 7, the audio decoder 8, the NTSC conversion circuit 9 and the D/A conversion circuit 10. In addition, the DVD reproducing apparatus 1 includes a user interface 12 which is an interface between the controller 11 and an input performed by a user; and a memory 13 serving as a data storage portion for the controller 11.

Each of the pickup 2 for reproducing the RF signal from the recording medium 100, the RF circuit 3 for processing the RF signal and the data decoder 4 for decoding reproduced data subjected to the process by the RF circuit 3 is structured to have a processing speed which is, for example, two times the speed in a usual process. The usual process is a process which is performed when, for example, data for an image at one angle is read from the recording medium 100.

Also the demultiplexer 5 is structured to be capable of raising the data processing speed to two times the usual processing speed. As a result, the demultiplexer 5 is able to divide supplied compressed data of a main image, compressed data of a sub-image and compressed audio data in a manner similar to a usual process.

The elements of the DVD reproducing apparatus 1 will now be described. The same elements as the DVD reproducing apparatus according to the first embodiment are given the same reference numeral as those shown in FIG. 2. Therefore, the same elements are omitted from description.

The DVD reproducing apparatus 1 supplies coded image data and the like recorded on the recording medium 100 to the track buffer 21 through the pickup 2, the RF circuit 3 and the data decoder 4.

The track buffer 21 has the first storage region 21a and the second storage region 21b. The track buffer 21 stores digital data supplied to each of the storage regions 21a and 21b. As described above, digital data above includes compressed data of the main image, compressed data of the sub-image and compressed audio data divided by the demultiplexer 5.

The track buffer 21 absorbs the difference between the processing speed of the data decoder 4 and that of the demultiplexer 5. In accordance with a command for transference issued from the demultiplexer 5, the data decoder 4 transmits digital data to the demultiplexer 5.

As described above, the demultiplexer 5 has the processing speed which is two times the usual processing speed. The demultiplexer 5 alternately fetches digital data transmitted from each of the storage regions of the track buffer 21 so as to divide obtained digital data into compressed data of the main image, compressed data of the sub-image and compressed audio data. Then, the demultiplexer 5 transmits divided data to the first video decoder 22 or the second video decoder 23, the sub-image decoder 7 and the audio decoder 8.

Compressed data of the main image which is transmitted to the first video decoder 22 and the second video decoder 23 is so-called coded image data which is composed of so-called I pictures, P pictures and B pictures. Compressed data of the main image is, in, for example, GOP units, transmitted to each of the first video decoder 22 and the second video decoder 23. Compressed data of the main image, compressed data of the sub-image and compressed audio data are packed and supplied to each decoder disposed next to the demultiplexer 5.

Each of the first video decoder 22 and the second video decoder 23 has a frame memory provided with three decoding storage regions for decoding I pictures, P pictures and B pictures.

The first and second video decoders 22 and 23 decode each of the supplied coded image data items. The decoding process is performed by performing inter-frame prediction. Image data decoded by the first and second video decoders 22 and 23 is supplied to the switch 24.

The switch 24 supplies either of decoded image data supplied from the first video decoder 22 or that supplied from the second video decoder 23 to the following sub-image decoder 7. The switch 24 is operated by the controller 11.

When a switching command is issued during a process for transmitting decoded image data from the track buffer 21, the switch 24 causes decoded image data to be transmitted from the second video decoder 23. Therefore, coded image data decoded by the first video decoder 22 and the that decoded by the second video decoder 23 are instantaneously switched by the switch 24. The above-mentioned switching operation is performed when, for example, the angle of the image is switched.

Decoded image data transmitted through the switch 24 is, as an image, displayed on the monitor 200 through the sub-image decoder 7 and the NTSC conversion circuit 9.

Therefore, the DVD reproducing apparatus 1 according to the second embodiment is able to reproduce an image at another angle during reproduction of an image at an angle. Therefore, the DVD reproducing apparatus 1 is able to display, on the monitor 200, the image at the other angle at the instant that the switching has been performed.

The DVD reproducing apparatus 1 enables a user to prevent missing of a required image at another angle when switching to the image at the other angle is performed.

Images at angles are not limited to seamless images. The images may be non-seamless images. The DVD reproducing apparatus 1 according to the present invention is able to instantaneously switch an image regardless of the type of the image.

If an image at a certain angle is switched to an image at another angle, same sub-image data and audio data for the image at the certain angle are employed. That is, sub-image data and audio data of the image at the other angle are not transmitted from the demultiplexer 5. Moreover, decoding is not performed.

If the bit rate of coded image data which is supplied to the first video decoder 22 and that of coded image data which is supplied to the second video decoder 23 are different from each other, an available amount in a video buffer (not shown) disposed between the demultiplexer 5 and the first video decoder 22 and that disposed between the demultiplexer 5 and the second video decoder 23 are monitored by, for example, the controller 11. Then, data is required to be transmitted to the video buffer having the available region from the demultiplexer 5. Each of the video buffer is a buffer for absorbing the speed of the distributing process which is performed by the demultiplexer 5 and decoding speed of each video decoder. That is, the above-mentioned buffer is operated until the available space is used. Then, data is transmitted to another buffer so as to absorb the difference in the bit rate.

Figure 9:
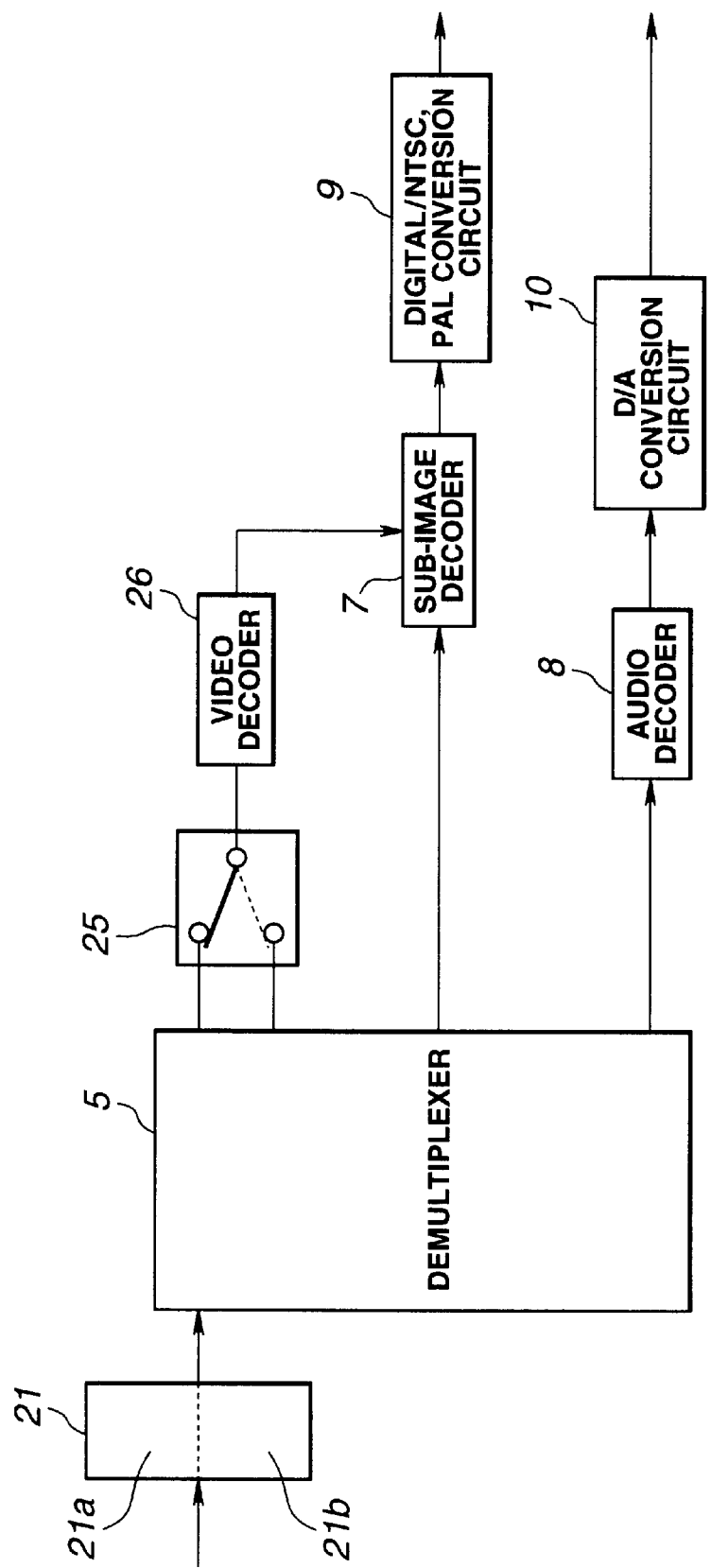
FIG. 9 is a circuit diagram showing the DVD reproducing apparatus according to the second embodiment and having a changed essential portion.

The DVD reproducing apparatus 1 according to the second embodiment may includes a video decoder 26 having processing speed which is two times usual processing speed and a switch 25 disposed between the demultiplexer 5 and the video decoder 26, as shown in FIG. 9.

The switch 25 transfers coded image data supplied from the demultiplexer 5 to the video decoder 26, coded image data being transferred in, for example, GOP units. The operation of the switch 25 is performed by the controller 11. If a switching command is issued during a process for transmitted coded image data corresponding to an image at a certain angle, the switch 25 causes coded image data corresponding to an image at another angle to be transferred. Therefore, the switching operation of the switch 25 causes either of coded image data corresponding to an image at a certain angle or coded image data corresponding to an image at another angle to be transmitted.

The video decoder 26 is able to decode coded image data supplied from the switch 25 at processing speed which is two times usual processing speed. Compressed data decoded by the video decoder 26 is, as an image, displayed on the monitor 200 through the sub-image decoder 7 and the NTSC conversion circuit 9.

Since the DVD reproducing apparatus 1 includes the switch 25 and the video decoder 26 having decoding speed which is two times usual speed, the DVD reproducing apparatus 1 is able to display a seamless image and instantaneously switch the seamless image.

A third embodiment of the present invention will now be described. A DVD reproducing apparatus according to this embodiment has a structure to which the signal reproducing apparatus and signal reproducing method according to the present invention are applied so as to reproduce a DVD.

Figure 10:
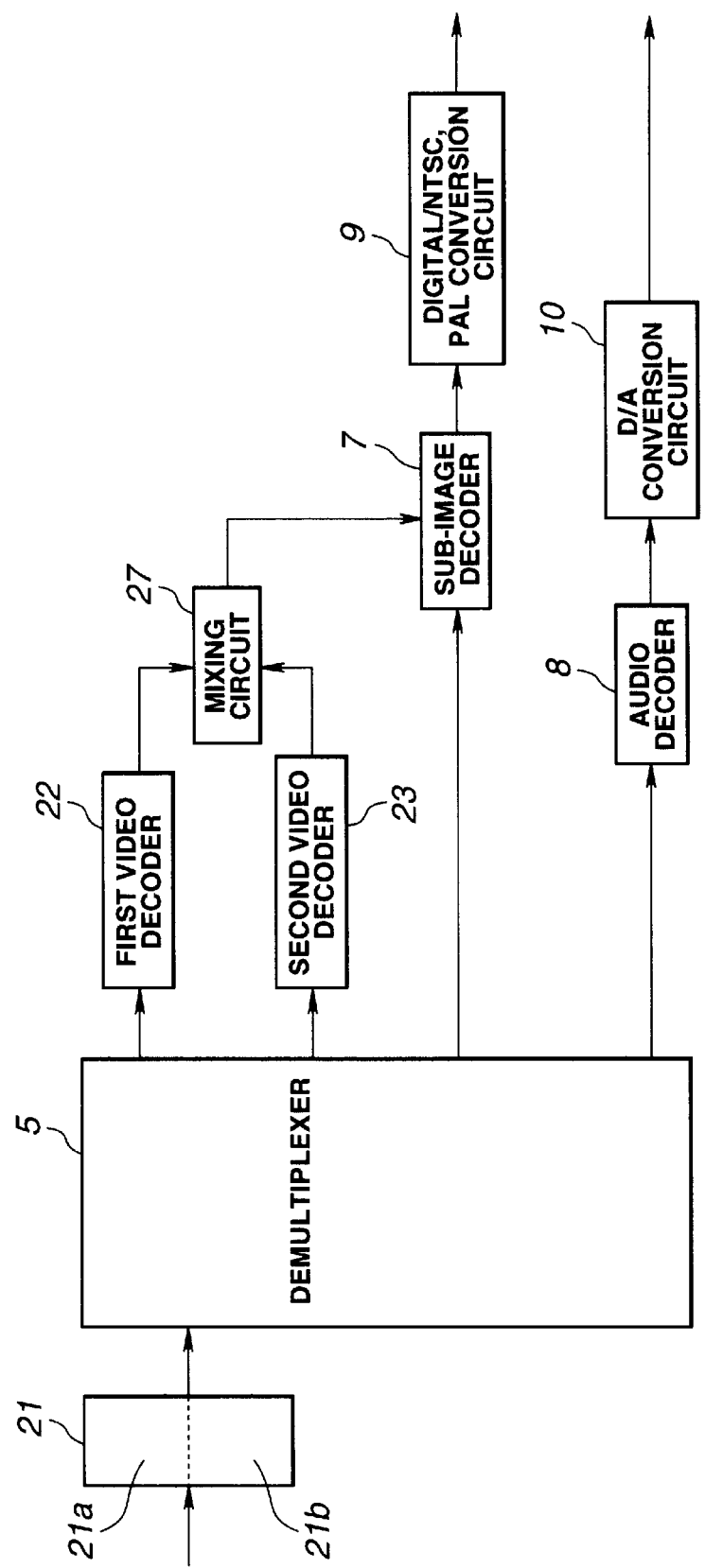
FIG. 10 is a circuit diagram showing an essential structure of a DVD reproducing apparatus according to a third embodiment of the present invention.

The DVD reproducing apparatus according to the third embodiment has a structure with which images at a plurality of angles are simultaneously reproduced. Therefore, the DVD reproducing apparatus according to this embodiment, as shown in FIG. 10, includes a first and second video decoders 23 and 24 to which compressed data of a main image is supplied from the demultiplexer 5; and a mixing circuit 27 for mixing decoded image data items transmitted from the first video decoder 22 and the second video decoder 23, respectively.

That is, the DVD reproducing apparatus 1 according to the third embodiment has the structure having the mixing circuit 27 provided in place of the switch 24 provided for the DVD reproducing apparatus 1 according to the second embodiment.

The DVD reproducing apparatus 1 having the above-mentioned structure including the mixing circuit 27 which is able to mix decoded image data transmitted from the first video decoder 22 and that transmitted from the second video decoder 23 with each other so that mixed decoded image data is supplied to the monitor 200.

Figure 12:
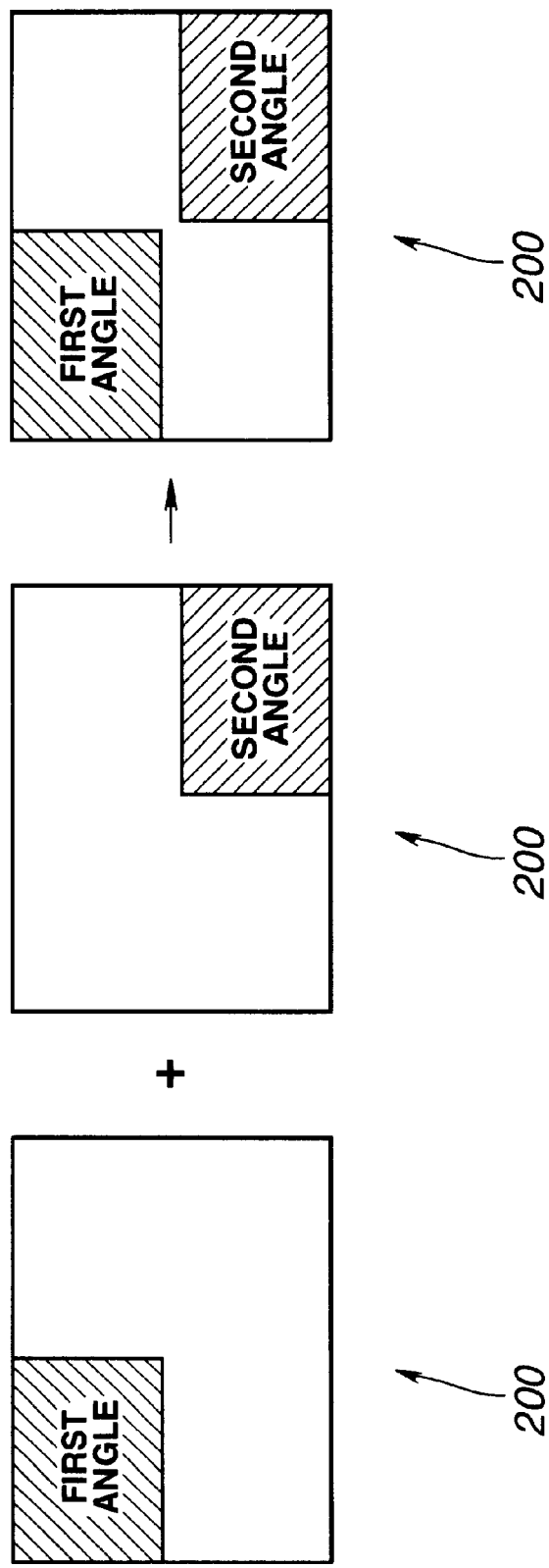
FIG. 12 is a plan view showing a monitor on which images at a plurality of angles are displayed.

If decoded image data forming an image at a first angle is transmitted from the first video decoder 22 and decoded image data forming an image at a second angle is transmitted from the second video decoder 23, the image at the first angle (shown in FIG. 12A) and the image at the second angle (shown in FIG. 12B) can simultaneously be displayed (as shown in FIG. 12C), as shown in FIGS. 12A and 12B.

If the image according the first angle and that at the second angle are not overlapped in the screen of the monitor 200 as shown in FIG. 12C, the DVD reproducing apparatus 1 may be arranged in such a manner that the first video decoder 23 and the second video decoder 24 share the frame memory having three decoding storage regions.

Figure 13:
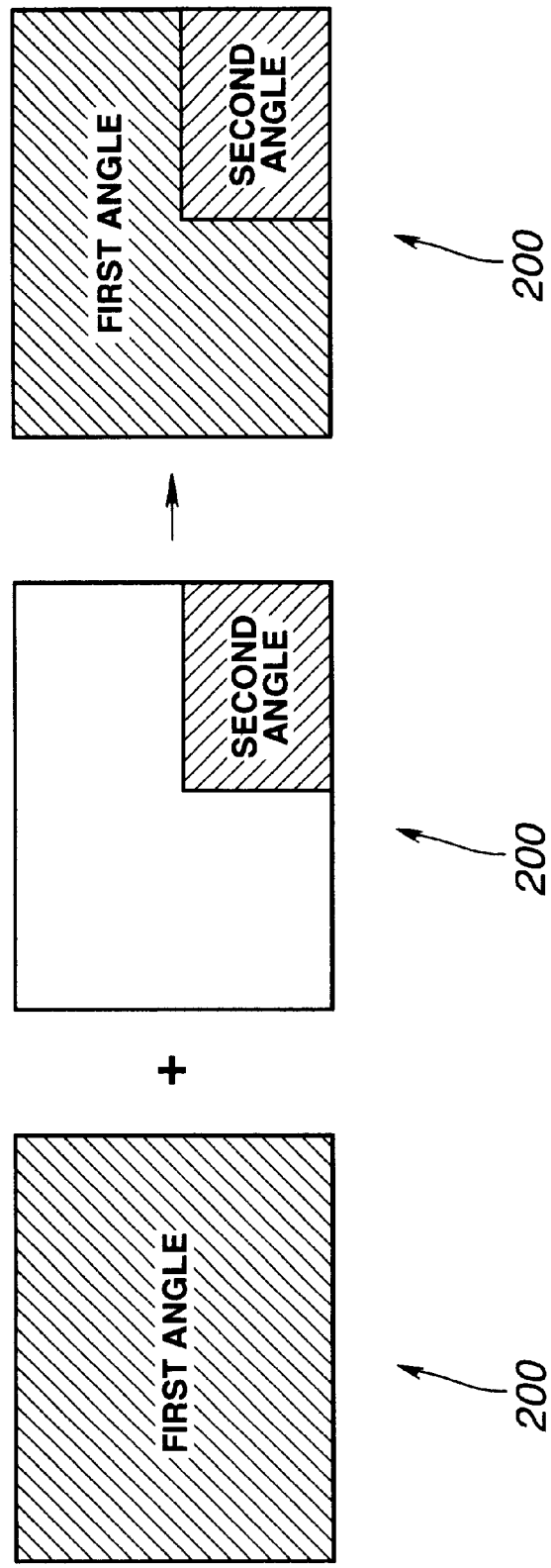
FIG. 13 is a plan view showing a monitor on which images at a plurality of angles are displayed by another display method.

When each of the first video decoder 22 and the second video decoder 23 has the frame memory, display can be performed as shown in FIGS. 13A and 13B in such a manner that an image at a first angle (shown in FIG. 13A) is displayed in the overall portion of the display screen of the monitor 200 and an image at a second angle (shown in FIG. 13B) is displayed in a portion of the display screen of the monitor 200 (as shown in FIG. 13C).

The DVD reproducing apparatus 1 having the frame memory composed of three decoding storage region is able to decode I pictures, P pictures and B pictures. Thus, the DVD reproducing apparatus 1 is able to perform a usual reproduction operation.

Therefore, the DVD reproducing apparatus 1 is able to simultaneously perform usual reproduction of images at two different angles similarly to the structure having two video decoders. Therefore, the DVD reproducing apparatus 1 is able to display, on the monitor 200, images at two different angles which have been reproduced usually.

Figure 11:
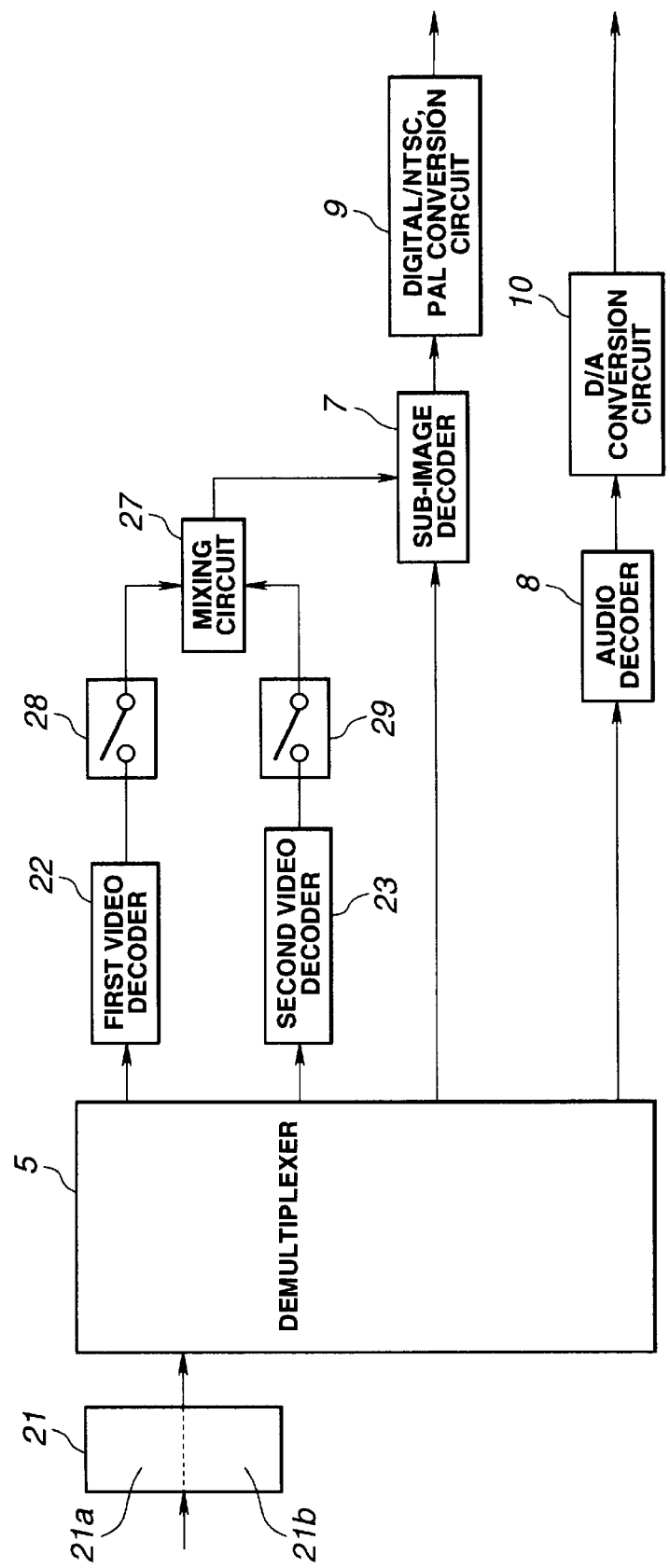
FIG. 11 is a circuit diagram showing an essential structure of a DVD reproducing apparatus according to a fourth embodiment of the present invention.

A fourth embodiment of the present invention will now be described. A DVD reproducing apparatus according to the fourth embodiment has a structure to which the signal reproducing apparatus and the signal reproducing method according to the present invention are applied so as to reproduce a DVD. The DVD reproducing apparatus according to the fourth embodiment is able to simultaneously reproduce images at a plurality of angles. Moreover, the DVD reproducing apparatus is able to instantaneously and seamlessly switch an image at the angle which is being reproduced. Therefore, as shown in FIG. 11, the DVD reproducing apparatus according to this embodiment includes first and second video decoders 22 and 23 arranged to be supplied with compressed data of a main image supplied from a demultiplexer 5; a mixing circuit 27 for mixing decoded image data items transmitted from the first video decoder 22 and the second video decoder 23, respectively; a switch 28 for permitting/inhibiting supply of decoded image data transmitted from the first video decoder 22 to the mixing circuit 27; and a switch 29 for permitting/inhibiting supply of decoded image data transmitted from the second video decoder 23 to the mixing circuit 27.

When the switch 28 and the switch 29 of the DVD reproducing apparatus 1 having the above-mentioned structure are switched on, the mixing circuit 27 is able to mix decoded image data transmitted from the first video decoder 22 and that transmitted from the second video decoder 23 with each other and supply mixed data to the monitor 200. The DVD reproducing apparatus 1 is able to supply mixed images, for example, as shown in FIGS. 12C and 13C, to the monitor 200.

Moreover, the DVD reproducing apparatus 1 includes the switches 28 and 29 to select the first video decoder 22 or the second video decoder 23 so as to decode coded image data by switching the switch 28 and the switch 29 on or off. In this case, when the switch 28 is switched on, the switch 29 is switched off. When the switch 28 is switched off, the switch 29 is switched on.

If a command for switching is issued during output of decoded image data forming an image at a certain angle from the first video decoder 22, the switch 28 is switched off and the switch 29 is switched on. Thus, decoded image data forming an angle at another angle can be transmitted from the second video decoder 23. That is, coded image data which has been decoded by the first video decoder 22 or the second video decoder 23 is instantaneously selected so as to be transmitted.

Therefore, the DVD reproducing apparatus 1 is able to instantaneously switch an image at another angle during reproduction of an image at a certain angle. Thus, the DVD reproducing apparatus 1 is able to display, on the monitor 200, the selected image at the other angle.

As described above, the DVD reproducing apparatus 1 according to the fourth embodiment is able to simultaneously reproduce images at a plurality of angles. Moreover, the DVD reproducing apparatus 1 is able to instantaneously switch between seamless images at different angles.

The DVD reproducing apparatus 1 according to this embodiment enables a user to simultaneously watch images at different angles. Moreover, missing of an image at a required angle can be prevented when an image at a certain angle is switched.

Although the DVD reproducing apparatus 1 according to the second to fourth embodiments has the structure to reproduce a DVD on which images at two angles have been recorded, the DVD reproducing apparatus according to the present invention is able to reproduce a DVD on which images at three or more angles, for example, m (which is a multiple) angles have been recorded. In this case, the DVD reproducing apparatus 1 is structured in such a manner that two elements and the processing speed which is two times are changed to m elements and processing speed which is m times.

The signal reproducing apparatus according to the present invention includes the decoding means for generating decoded image data at the plural angles by decoding coded image data at a certain angle among the plural angles read by the reading means; the decoding storage means on which decoded image data at the certain angle among the plural angles generated by the decoding means is stored; the displaying storage means having the storage regions on which image data to be displayed is stored and which enables division display to be performed; and the control means for subjecting decoded image data stored in the decoding storage means to a contraction process, the writing decoded image data, which has been subjected to the contraction process, on the storage region of the displaying storage means and reading image data to be displayed and including decoded image data written on the storage region. Thus, images at a plurality of angles composed of coded image data can simultaneously be reproduced.

Therefore, the signal reproducing apparatus according to the present invention is able to simultaneously present images regardless of a fact that the images are non-seamless images. Moreover, missing of an image required for a user can be prevented.

The signal reproducing apparatus according to the present invention includes the m storage means on which coded image data read by the reading means is stored; and the decoding means for generating decoded image data by decoding coded image data transmitted from the m storage means. Thus, a plurality of coded image data items can be decoded. As a result, images at a plurality of angles can instantaneously be reproduced or the same can simultaneously be reproduced.

The signal reproducing apparatus according to the present invention is able to instantaneously switch to an image at another angle even if a seamless image is reproduced.

The signal reproducing method includes: a decoding step for generating decoded image data at the plural angles by decoding coded image data at a certain angle among the plural angles read in a reading step; decoded image data storing step for storing decoded image data at the certain angle among the plural angles generated in the decoding step; a displaying storage step using storage regions on which image data to be displayed is stored and which enables division display to be performed; and a control step for subjecting decoded image data stored in the decoded image data storing step to a contraction process, writing decoded image data, which has been subjected to the contraction process, on the storage region which is used in the displaying storage step and reading image data to be displayed and including decoded image data written on the storage region. Thus, images at a plurality of angles formed by coded image data can simultaneously be reproduced.

Therefore, the signal reproducing method according to the present invention is able to simultaneously present images regardless of a fact that the images are non-seamless images. Moreover, missing of an image required for a user can be prevented.

The signal reproducing method according to the present invention includes: m storing steps for storing coded image data read in a reading step; and a decoding step for generating decoded image data by decoding coded image data transmitted from the m storing steps. Therefore, a plurality of coded image data items can be decoded. Thus, images at a plurality of angles can simultaneously be reproduced or the same can instantaneously be switched so as to be reproduced.

The above-mentioned signal reproducing method is able to instantaneously switch to an image at another angle even if a seamless image is reproduced.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. Signal reproducing apparatus for use with a record medium on which images observed from different angles are recorded as coded image data comprising:

reading means for reading said coded image data from said record medium to recover said different angles of images;

decoding means for decoding the image data corresponding to said angles, as read by said reading means;

decoding storage means for storing said decoded image data corresponding to said angles, one angle at a time;

display storage means having plural storage regions, each storage region being operable to store image data corresponding to a respective angle and from which the respective angle image is displayed at an associated region of an image display device; and control means for reading and contracting said coded image data stored in said decoding storage means and writing the contracted image data of a particular one of said angles into a predetermined storage region of said display storage means, thereby enabling the image data stored in said predetermined storage region and corresponding to said particular angle to be displayed at a predetermined, associated region of said image display device, whereby contracted images at said plural angles are displayed on said image display device simultaneously;

wherein said coded image data is intra-frame and inter-frame predictive image data corresponding to images at plural angles read from said record medium, and said decoding storage means comprises at least two decoding storage units, each for storing frames of said intra-frame or inter-frame image data following decoding thereof, to enable simultaneous reproduction of said contracted images at plural angles in both forward and reverse directions.

2. The signal reproducing apparatus of claim 1, wherein said at least two decoding storage means comprises three decoding storage units for storing intra-frame image data and inter-frame image data.

3. Signal reproducing apparatus for use with a record medium on which images observed from different angles are recorded as coded image data comprising:

reading means for reading said coded image data from said record medium to recover said different angles of images;

a plurality m storage means for storing the coded image data read by said reading means; and decoding means for decoding the image data corresponding to respective angles, as read by said reading means and as stored in said m storage means, said decoding means comprising m image decoders to produce decoded image data corresponding to m angles, respectively; and at least one switch for selectively supplying, to an image display device, the decoded image from respective ones of said m image decoders, thereby enabling instantaneous switching, on said image display device, between images at different angles.

4. The signal reproducing apparatus of claim 3, wherein said decoding means is operable at a decoding speed m times a normal decoding speed.

5. The signal reproducing apparatus of claim 3, wherein said at least one switch comprises m switches provided at respective outputs of said m image decoders, and said apparatus further including a mixer for mixing the decoded images from respective ones of said m image decoders when each of said m switches is switched on to provide the respective decoded output, and for supplying a mixed signal containing the decoded images to an image display device at respective locations thereof such that said decoded images at different angles are simultaneously displayed; and when only a single one of said switches is switched on, said mixer provides decoded images of only a single angle to said image display device to be displayed thereon, whereby images of different angles are instantaneously switchable for non-simultaneous display on said image display device as well as simultaneously displayable on different portions of said display device via control of said m switches.

6. A signal reproducing method for use with a record medium on which images observed from different angles are recorded as intra-frame and inter-frame coded image data, comprising the steps of:

reading said coded image data from said record medium to recover said different angles of images;

decoding the read image data corresponding to said angles;

storing said decoded image data corresponding to said angles in at least two storage regions, one angle at a time, each storage region being operable to store a decoded frame of said intra-frame coded and inter-frame coded image data; and in a reverse reproduction mode, reading and contracting said decoded image data from said at least two storage regions and writing the contracted image data into a predetermined storage region of a display storage area, thereby enabling the image data stored in said predetermined storage region and corresponding to a particular one of said angles to be displayed at a predetermined, associated region of an image display device, such that contracted moving images at said plural angles are displayed on said image display device in a reverse direction simultaneously during a reverse reproduction operation, and simultaneously in a forward direction during a forward reproduction operation.

7. A signal reproducing method for use with a record medium on which images observed from different angles are recorded as coded image data, comprising the steps of:

reading said coded image data from said record medium to recover said different angles of images;

storing the read coded image data in a plurality m storage units; and decoding the image data stored in respective storage units and corresponding to respective angles using m image decoders to produce decoded image data corresponding to m angles, respectively;

selectively supplying to an image display device the decoded image from respective ones of said m image decoders, thereby enabling instantaneous switching between images at different angles displayed on said image display device.

8. The signal reproducing method of claim 7, further comprising:

selecting, in a simultaneous image display operation, outputs of a plurality of said decoders for display on said image display device and mixing the decoded outputs of said decoders selected so as to simultaneously display decoded images at different angles on different locations of said image display device; and selecting, in a non-simultaneous image display operation, the output of only a single one of said decoders at a time for display of a single image angle on said image display device at a given time, and instantaneously switching between decoder outputs to instantaneously switch between image angles displayed non-simultaneously on said image display device.

* * * * *